Patented Jan. 28, 1941

2,230,031

UNITED STATES PATENT OFFICE 2,230,031

METHOD OF PREPARING COFFEE AND PRODUCT THEREOF

George A. Fisher, Indianapolis, Ind., assignor to William S. Scull Company, Camden, N. J.

No Drawing. Application July 19, 1937, Serial No. 154,393

9 Claims. (Cl. 99—71)

The present application relates to a method of preparing coffee, and more particularly to a method of brewing coffee in such a manner that it may be filled into containers, hermetically sealed therein, and thereafter kept for indeterminate periods; later to be either heated or chilled for use, all without damaging the flavor of the brew.

It is well known to coffee drinkers that it is impossible, under ordinary circumstances, to brew coffee any material length of time before it is to be used without producing a brew which, when it is consumed, lacks the rich smooth flavor of good coffee. Particularly damaging to the flavor of brewed coffee is the act of brewing the coffee, allowing it to cool, and subsequently reheating it before use.

It is also well recognized that, although iced coffee is a deliciously palatable drink for warm weather, the coffee must be made very strong indeed in the first instance, if it is to be potable after it has been chilled. This is for the reason that, to produce good iced coffee, it is essential to pour the coffee, while very hot, over the ice to be used in chilling it; which necessarily results in melting a large volume of ice, with consequent serious dilution of the brew.

After a long period of research, I have succeeded in producing a coffee brew which may be successfully kept for indefinite periods in hermetically sealed cans at any desired temperature; and which may subsequently be reheated before use, without damaging the flavor of the brew. A further advantage of my product is the fact that it may be pre-chilled in its cans, and thereafter poured over ice, in which case a very small quantity of ice is melted so that there is a very slight dilution; or, if facilities are present for sufficiently chilling the coffee in the can, no ice need be used at all.

My experiments have led me to the conclusion that the reason for the deterioration in the flavor of coffee when it is allowed to stand or when it is reheated after cooling, lies in the fact that the water which is used in the brewing of the coffee contains a considerable volume of air in solution; and that some constituent of the air, probably oxygen, attacks a soluble constituent of the coffee contained in the brew to effect a chemical change in the characteristics of that constituent or constituents of the brew. I have reached this conclusion because I have found that, if the water used in preparing the brew is preliminarily deaerated, the flavor of the brew is not materially changed when the brew is allowed to stand in the sealed containers, or when it is reheated, or when it is chilled.

While I consider the step of deaerating the water to be used in the brew to be the most important step of my herein-described process, I do not consider that it is, alone, responsible for the results which I have attained.

It is the primary object of the present invention to provide a method of producing a coffee brew which shall have the above-described characteristics, and to produce a brew having such characteristics. To the accomplishment of the above and related objects my invention may be embodied in the form described in the following specification, attention being called to the fact, however, that the specific steps and the specific characteristics described are by way of illustration only, and that change may be made therein, so long as the scope of the appended claims is not violated.

In carrying out my process, the following steps are preferably utilized. Water, preferably soft water, is heated in an open container to a temperature of approximately 210° to 212° F. and that temperature is held for a period of approximately one hour. While I prefer to maintain the temperature within the above limits, no serious effects follow from permitting the temperature to drop as low as 205° for short periods; and, while I prefer to continue the high temperature for approximately an hour, good effects can be obtained by continuing it for as long as forty-five minutes; but the water must be retained at the specified temperature for at least forty-five minutes.

The result of this step is to drive substantially all of the dissolved air out of the water.

Roasted ground coffee beans are now placed in a basket with a perforated bottom which is covered by filter paper. While I prefer to use coffee which has been very finely ground, less finely ground coffee may be used. Obviously, the period of percolation, hereinafter described, must be increased as the fineness of the coffee is decreased.

Deaerated water is now permitted to percolate through the coffee and filter paper into a suitable receptacle. I prefer to charge a mass of deaerated water into a glass bowl over which the coffee-containing basket is suspended, and to pump the water into the top of the basket, permitting it to trickle through the basket back into the bowl; and preferably the liquid will be recirculated through the coffee a plurality of times.

It is my present belief that optimum proportions of water to coffee are three gallons to twenty-four ounces; and, in the mechanism which I have used, the water is pumped from the bowl through a pipe projecting upwardly through the center of the basket, and is permitted to fall from said pipe to the top of the coffee mass, thence to percolate through the coffee and filter paper back to the bowl, whence it is re-pumped upwardly through the pipe. Using three gallons of water and twenty-four ounces of finely ground coffee, the circulating period is preferably approximately nine (9) minutes, which will be increased somewhat if the coffee is coarser than what is known as "drip ground".

During the percolation period, the liquid will, of course, tend to drop in temperature; and it may be desirable to heat the bowl during the percolation period. Preferably, the temperature of the liquid during the percolation period should be approximately 195° F., and should not fall below 190° F.

After the percolation period, the brew is drawn off from the bowl either to a suitable reservoir or directly to containers. The containers must preferably be of such character that they may be hermetically sealed; and I have found that cans lined with vinylite constitute satisfactory containers for this use. I have found that ordinary tin cans or cans with coatings of the enamel type tend to produce a foreign taste in the brew; but that cans lined with vinylite do not have that tendency. The brew is preferably filled into the cans at a temperature of 190° to 195° F., whereupon the cans are immediately hermetically sealed.

While I believe that it might be feasible to end the process at this point, I prefer to pass the sealed cans through a sterilizing step which can be accomplished by heating them and their contents to a temperature of approximately 212° F., and holding that temperature for approximately fifteen (15) minutes; whereafter the cans and their contents should be rapidly cooled to a temperature at least below 100° F. The sterilizing step may be carried out in any sort of a heating apparatus, and the heating may be accomplished in a water bath, a steam chamber, or a dry oven.

I claim as my invention:

1. The method of preparing brewed coffee which includes the steps of preliminarily deaerating a mass of water, and then percolating such mass of water through a mass of roasted and ground coffee beans, while holding the temperature of the liquid near the boiling point of water.

2. The method of preparing brewed coffee which includes the steps of preliminarily deaerating a mass of water then percolating such mass of water through a mass of roasted and ground coffee beans, while holding the temperature of the liquid near the boiling point of water, thereafter filling the brew into containers, sealing said containers, and rapidly cooling the contents of such containers to a temperature at least below 100° F.

3. The method of preparing brewed coffee which includes the steps of preliminarily deaerating a mass of water by holding the temperature thereof near the boiling point in an open vessel for at least forty-five minutes, then percolating such mass of water through a mass of roasted and ground coffee beans, while holding the temperature of the liquid near the boiling point of water, thereafter filling the brew into containers, sealing said containers, and rapidly cooling the contents of such container to a temperature at least below 100° F.

4. The method of preparing brewed coffee which includes the steps of preliminarily deaerating a mass of water, percolating such mass of water through a mass of roasted and ground coffee beans, while holding the temperature of the liquid near the boiling point of water, promptly filling the resultant brew into containers and hermetically sealing the containers, thereafter heating the containers and their contents to a sterilizing temperature and maintaining such condition for a sterilizing period, and then rapidly cooling the containers and their contents to a temperature at least below 100° F.

5. The method of preparing brewed coffee which includes the steps of preliminarily deaerating a mass of water by holding the temperature thereof near the boiling point in an open vessel for at least forty-five minutes, percolating such mass of water through a mass of roasted and ground coffee beans, while holding the temperature of the liquid near the boiling point of water, promptly filling the resultant brew into containers and hermetically sealing the containers, thereafter heating the containers and their contents to a sterilizing temperature and maintaining such condition for a sterilizing period, and then rapidly cooling the containers and their contents to a temperature at least below 100° F.

6. The method of preparing brewed coffee which includes the steps of preliminarily deaerating a mass of water, percolating such mass of water through a mass of roasted and ground coffee beans, while holding the temperature of the liquid near the boiling point of water, promptly filling the resultant brew into containers and hermetically sealing the containers, thereafter heating the containers and their contents to a temperature of approximately 212° F. and maintaining such temperature for a sterilizing period, and then rapidly cooling the containers and their contents to a temperature at least below 100° F.

7. The method of preparing brewed coffee which includes the steps of preliminarily deaerating a mass of water, percolating through a mass of roasted ground coffee beans at least a portion of such deaerated water in substantially the proportions of three gallons of deaerated water to twenty-four ounces of coffee beans, while holding the temperature of the liquid near the boiling point of water, promptly filling the resultant brew into containers and hermetically sealing the containers, thereafter heating the containers and their contents to a sterilizing temperature and maintaining such condition for a sterilizing period, and then rapidly cooling the containers and their contents to a temperature at least below 100° F.

8. The method of preparing brewed coffee which includes the steps of preliminarily deaerating a mass of water by holding the temperature thereof near the boiling point in an open vessel for at least forty-five minutes, percolating through a mass of roasted ground coffee beans at least a portion of such deaerated water in substantially the proportions of three gallons of deaerated water to twenty-four ounces of coffee beans, while holding the temperature of the liquid near the boiling point of water, promptly filling the resultant brew into containers and hermetically sealing the containers, and then rapidly cooling the containers and their contents to a temperature at least below 100° F.

9. The method of preparing brewed coffee which includes the step of preliminarily deaerating a mass of water by heating it at or near the boiling point, then percolating such deaerated water through a mass of roasted and ground coffee at a lower temperature but sufficiently near the boiling point to extract the desirable constituents from the coffee, thereafter filling the brew into containers and hermetically sealing said containers.

GEORGE A. FISHER.